United States Patent [19]

Parikh

[11] Patent Number: 5,423,017
[45] Date of Patent: Jun. 6, 1995

[54] METHOD OF AND APPARATUS FOR INCREASING EFFICIENCY OF AGER

[75] Inventor: Shrikant N. Parikh, Mesquite, Tex.

[73] Assignee: International Business Machines Corporation, Armonk, N.Y.

[21] Appl. No.: 872,731

[22] Filed: Apr. 22, 1992

[51] Int. Cl.$^6$ ............................................. G06F 12/12
[52] U.S. Cl. ............................. 395/425; 364/DIG. 1; 364/246.12
[58] Field of Search .............................. 395/400, 425; 364/200 MS, 900 MS

[56] References Cited

U.S. PATENT DOCUMENTS

| | | | |
|---|---|---|---|
| 4,035,778 | 7/1977 | Ghanem | 395/650 |
| 4,463,424 | 7/1984 | Mattson et al. | 395/425 |
| 4,597,041 | 6/1986 | Guyer et al. | 395/325 |
| 4,774,659 | 9/1988 | Smith et al. | 395/400 |
| 4,926,322 | 5/1990 | Stimac et al. | 395/500 |
| 4,967,353 | 10/1990 | Brenner et al. | 395/425 |
| 5,043,885 | 8/1991 | Robinson | 395/425 |
| 5,063,499 | 11/1991 | Garber | 395/580 |

FOREIGN PATENT DOCUMENTS 0280019 8/1988 European Pat. Off. .

OTHER PUBLICATIONS

'Working-Set Co-Processor' IBM TDB, vol. 32, No. 4A, Sep. 1989, pp. 240-242.
'A Virtual Memory for Microprocessors' Proceedings of the Annual Symposium on Computer Architecture, Symp. 2, Jan. 22, 1975, New York, pp. 80-84.
Bowater, R. J. Synchronous Co-Processor Support in a Virtual Memory System. Nov. 1990. TDB pp. 358-360.
Disbrow, J. R. One Pass Page Replacement Algorithm. May 1971, TDB pp. 3877-3878.
Rasmussen, E. C. A Self Correcting Segment Aging Frequency Heuristic. Aug. 1991, Research Disclosure n328.

*Primary Examiner*—Reba I. Elmore
*Assistant Examiner*—Hiep T. Nguyen
*Attorney, Agent, or Firm*—A. Bruce Clay

[57] ABSTRACT

Four classes are created herein for classifying all the processes on a computer system which utilizes an ager and a paging based memory management. A first class will include all processes which have received repeated central processing unit (CPU) time slices after the last servicing by the ager. A second class will include all processes which have received some CPU time slices, less than a certain preselected threshold value, since the last servicing by the ager. A third class will include all processes which have not received any CPU time slices since the last servicing by the ager. A fourth class will include all processes which have received no CPU time slices for a certain predefined number of services by the ager. Once the processes are all classified, the ager will service the processes in the order of: Class 4, Class 1, and then Class 2. The processes in Class 3 will not be serviced.

11 Claims, 2 Drawing Sheets

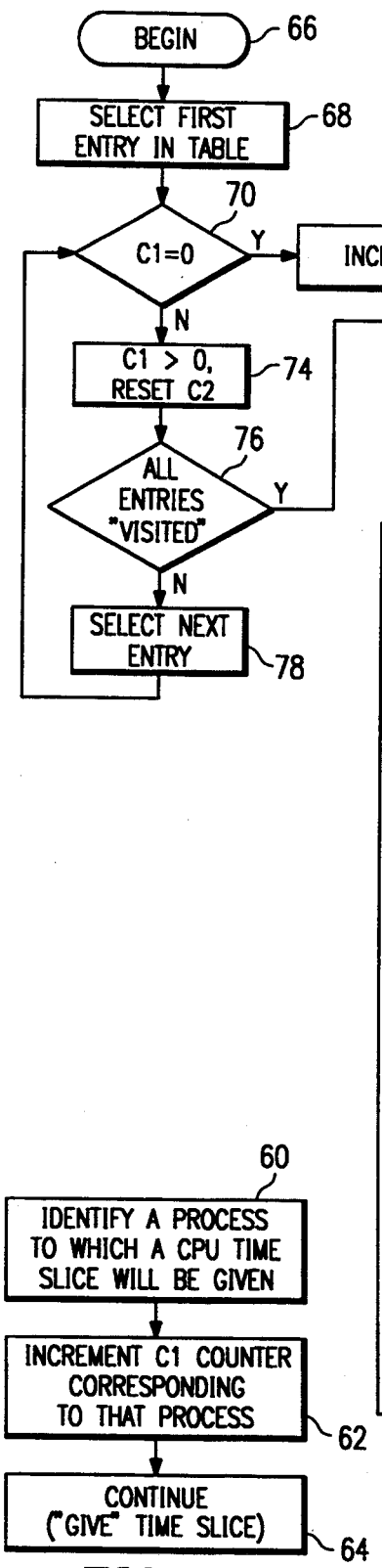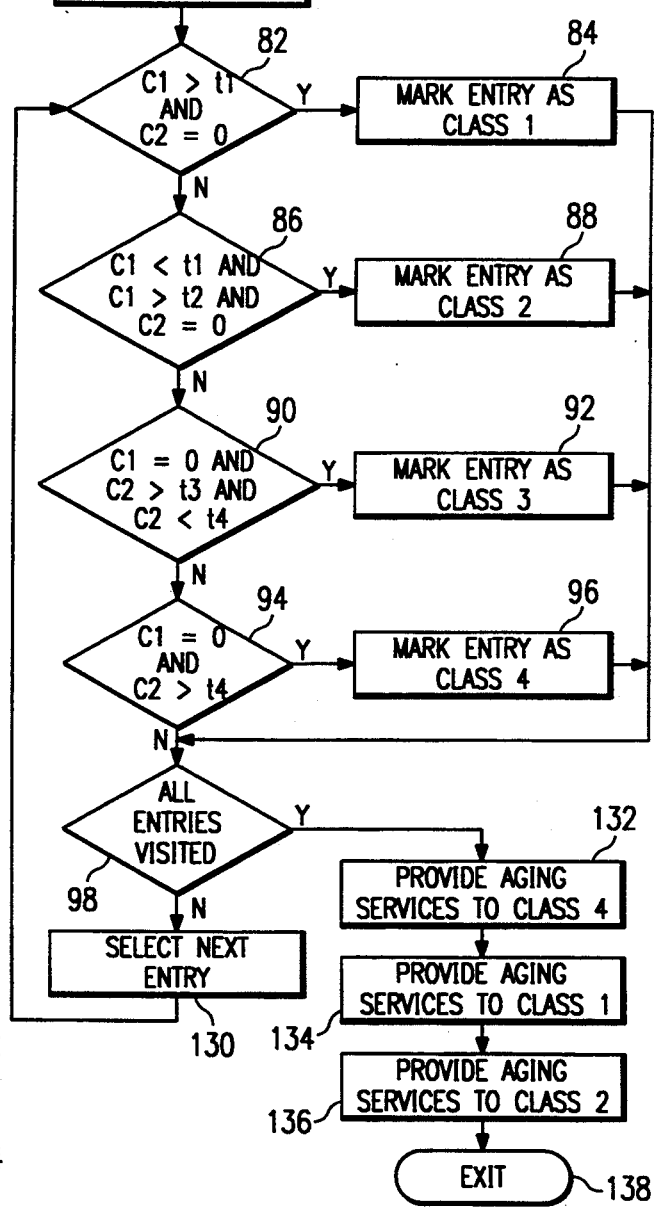

METHOD OF AND APPARATUS FOR INCREASING EFFICIENCY OF AGER

CROSS REFERENCE TO RELATED APPLICATIONS

This application is related in subject matter to the following applications filed concurrently herewith and assigned to a common assignee:

Application Ser. No. 07/872,732, filed by S. Parikh entitled Multi-Bit Vector for Page Aging; application Ser. No. 07/872,935, filed by S. Parikh entitled Method of Creating Data Structures to More Efficiently Manage Physical Memory In a Computer System; application Ser. No. 07/872,221, filed by S. Parikh entitled Tabulation of Multi-Bit Vector History and application Ser. No. 07/872,733, filed by S. Parikh entitled Tabulation of Multi-Bit Vector History and application Ser. No. 07/872,733, filed by S. Parikh entitled Method and Apparatus for Predetermined Pages for Swapping from Physical Memory.

The foregoing co-pending applications are incorporated herein by reference.

1. Technical Field of the Invention

This invention relates in general to memory management, and in particular to a method and apparatus for increasing the efficiency of an ager in a paging based memory management.

2. Background of The Invention

In modern microprocessors, the concept of virtual memory is used in conjunction with the physical memory. Virtual memory allows a smaller amount of physical memory (which is important due to cost) to be used with large and/or multiple applications. This is possible due to the fact that only a relatively small portion of any particular application is required to be in physical memory at any one time. Therefore, in computer systems running several applications simultaneously, it is possible to place only the data and code that is needed for the currently running application in physical memory while unused data and code is either left in virtual memory or stored on a hard disk drive.

A paging based memory management uses the concept of pages, each of which typically comprise 4K (thousands of bytes) of memory address. The virtual memory causes the application to believe there is 4 G (gigabytes) of memory available (for a 32 bit addressing scheme), whereas in reality there is typically anywhere from less than 1 M (megabyte) on up of physical memory (RAM). Thus it is necessary to be able to "swap" pages from physical memory to another location (ie., a disk/secondary storage).

In order to allow swapping in paging based memory management (for example, the "INTEL" Corporation 386 and 486 microprocessors, hereinafter "i386/i486"), it is typical to provide a paging system which serves to map and locate each individual page. Mapping is done by creating and maintaining page tables which list the location of each page in a page table entry (PTE). Thus, when an application requires a specific page, that page may be located by scanning through a page table. The PTE contains the address of the page as well as an accessed/not accessed flag which indicates a most recent usage.

In order to attempt to maximize the efficiency of the swapping into and out of physical memory, operating systems are provided with an ager. The purpose of an ager is to swap the least recently used pages out of physical memory when space is needed. The pages that have not been recently used will first be designated for an "idle" list and then will be swapped out as necessary. Thus, if there are pages not being used, it is more efficient to place them in storage (ie., disk) rather than take up space that may be needed in physical memory. Therefore, the ager and the paging system work in combination to keep track of the location of a page and to keep the pages that are actually needed in physical memory.

One key determinant of a base operating system's performance is the performance of the paging based memory management, since it can directly impact the rest of the system's performance in the dimensions of working set, response time, and capacity. Thus, it is imperative that the fundamental memory management be carefully designed. In modern microprocessors, support for paging memory management is present but limited.

The efficiency of paging memory management is directly impacted by: (1) the efficiency and effectiveness of the aging, (2) correct identification of the pages which no longer belong in the working set, and (3) length of the aging cycle. By shortening the aging cycle, there will typically be a proportionate decrease in the working set. For over-committed systems, it is imperative that the ager be sufficiently efficient, since the absence of such efficiency will allow the wrong pages to occupy physical memory.

In the paging based memory management architecture of some modern microprocessors such as the "i386/i486", there is a PTE corresponding to each page in memory, as previously described above. The page table entries reside in page tables. Each process has its own separate set of page tables and PTE's. Each time the contents of a page are accessed, an "accessed" flag in the PTE corresponding to that page is set by the base hardware. This flag tells the ager that the page has been accessed (or not accessed) since the last aging service or cycle through that page table. The ager clears the flag after scanning the PTE. Typically the ager must scan all the page tables of all processes in a system to complete one full aging cycle. Periodically the ager scans all the PTEs, checks the status of the bits, and takes the appropriate actions, which could include paging out the pages which were not accessed recently. In the "i386/i486" microprocessors, support for identification of the exact page access pattern including the exact order of access is limited to the "accessed/not accessed" bit in the PTE. In the base hardware, no page time stamping is available which will tell the paging memory management subsystem the exact order of the page accesses.

It is very important that the time allocated to the ager be utilized carefully: (1) the ager should be efficient at its chosen task of identifying the next set of pages to be paged out, and (2) the ager should be accurate in identifying the pages which need to be paged out. Incorrect decisions in this regard can significantly increase erroneous page-outs, increase the physical memory requirement, and ultimately can reduce the competitiveness of the system. The central processing unit (CPU) time consumed by the ager comes at the expense of the other processes in the system and a complete aging cycle can take several CPU time slices. For efficient utilization of the resources (such as CPU time) consumed by the ager, it is important that the ager judiciously allocate these available resources to different processes.

In addition to the efficiency of the functioning of the ager, it is also important to facilitate a superior selection of the pages designated for an "idle list" which will be paged out next. Current systems utilize an approximation of a least recently used (LRU) method to swap a page out of memory. This method can often lead to incorrect decisions, especially for highly dynamic and over committed systems. As previously described above, once access flags corresponding to two physical pages are set, there is no way for the operating system to determine which page was accessed first. Additionally, once the accessed flags of two PTEs corresponding to two different pages are reset, there is no way for the operating system to determine which one was accessed last. Thus, it is entirely possible that the ager will select an incorrect page (i.e., one that was most recently used) to be swapped out.

For example, while scanning PTEs, the ager may detect two PTEs with access flags reset. To the ager, this implies that after these flags were last reset, the pages were not accessed. It can designate both of these pages for the idle list (i.e., a list of potential candidates to be paged out) and eventually page out both of them if they are not accessed soon enough. In other words, both pages are treated equally from the perspective of the ager. However, one page can be of a very high usage (eg, a page containing code of a high usage software) which happens to have had no access in the immediate past, while the other page could be a genuinely low usage page. However, the first page has a higher probability of being accessed in the future than the second page. Due to the limitations of the ager, it is possible that when a page needs to be paged out, the first page (i.e., the high usage page) could be chosen, since from the limited perspective of the ager, both pages appear the same. Therefore, if the first page needs to be referenced again after being swapped out, a page fault will occur. A page fault typically causes a delay in processing time since the process being run must be halted while the page is located and swapped back into physical memory.

The accessed bit flag is set in a corresponding PTE whenever the page is accessed. The aging process scans the PTEs sequentially to identify the pages which have/have not been accessed and the pages not accessed are eventually designated for the idle list and may be paged out. The scanning process is inherently time consuming. Not all the PTEs in a page table need to be scanned, since only a sub-set of the pages corresponding to these PTEs will be present in physical memory. Typically, a large number of the PTEs may have to be scanned just to find an entry corresponding to a page that is present in physical memory. Essentially a very large number of entries may have to be scanned in order to locate the PTEs corresponding to the pages present in the physical memory.

Thus there is a need for a method and apparatus to more effectively manage memory in a computer system. In particular, a method and apparatus which utilizes ager more efficiently in a paging based memory management is required.

SUMMARY OF THE INVENTION

The invention disclosed herein comprises a method and apparatus for utilizing ager more efficiently which substantially eliminates or reduces the problems of prior art agers. The method and apparatus described herein increases the efficiency of ager by creating classes into which the processes are arranged.

In accordance with one aspect of the present invention, a method of increasing the efficiency of ager is provided. All the processes within a computer system are categorized into a plurality of classifications. Pages from the processes are then potentially swapped out of physical memory based upon an accessed/not accessed history.

In one embodiment, the processes are placed into one of four different classes. If the process has received a plurality of CPU time slices greater than a predetermined number after an aging service thereto, the process is a class one. If the process has received a plurality of CPU time slices less than the aforementioned predetermined number after an aging service thereto, the process is a class two. If the process has received no CPU time slices after an aging service thereto, the process is a class three. If the process has received no CPU time slices after a predesignated number of aging services thereto, the process is a class four. When it becomes necessary to locate pages for potential swapping, aging services are then provided to the processes in the order of class four, then class one and then class two.

In addition, a table may be created for maintaining a count for each process of every CPU time slice allocated thereto and for every time the ager detects there were no time slices allocated thereto. The count of time slices allocated will be reset each time the ager "visits" or performs an aging service to that process.

It is a technical advantage of the present invention that ager is pointed to the correct next process for aging service. By classifying the processes, ager will be able to visit the correct process when time is of the essence, i.e., when the system is over-committed and physical memory space is needed now.

BRIEF DESCRIPTION OF THE DRAWINGS

For a more complete understanding of the present invention and the advantages thereof, reference is now made to the Detailed Description in conjunction with the attached Drawings, in which:

FIG. 4 is a flow chart illustrating the flow of execution of a scheduler-dispatcher in accordance with the present invention; and FIG. 5 is a flow chart illustrating actions of the present invention each time ager obtains a CPU time slice.

DETAILED DESCRIPTION OF THE INVENTION

Figure 1:
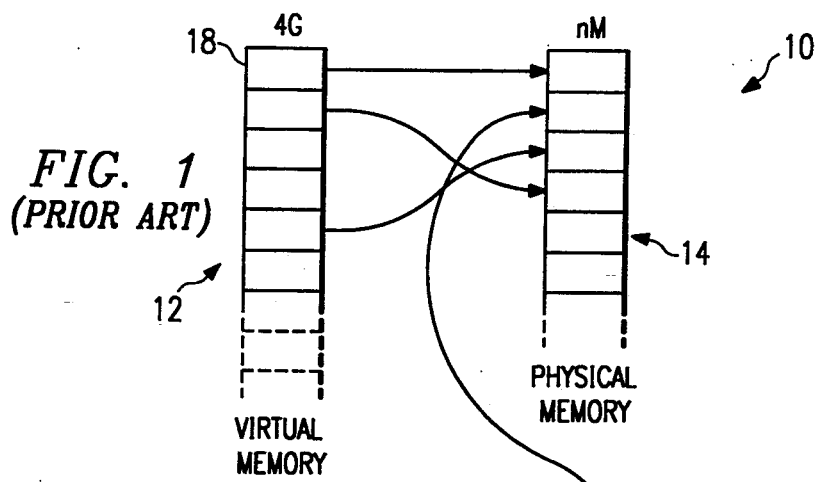
FIG. 1 is a graphical representation of the interrelationships of virtual memory, physical memory and storage.

Referring first to FIG. 1, a graphical representation of a memory system is generally identified by the reference numeral 10. When a computer program is written, it is written with the understanding that there is more usable memory available for addressable use than actually physically exits. Typically, four gigabytes (G) of virtual (i.e., not really existing) addressable memory 12 is provided. While the amount of physical memory (RAM) 14 varies from computer system to computer system, there is less physical memory 14 available than there is virtual memory 12. As shown in FIG. 1, the memory 14 has n M (megabytes) of memory, wherein n represents a variable number typically between 5 and 64. Thus, computer hardware may be provided with a storage device 16 such as, for example, a hard disk drive for use in conjunction with the physical memory 14.

As a process (i.e., a computer program) is run on a computer system (see FIG. 5), a page (comprising 4K of data) such as indicated by the reference numeral 18 may be transferred from virtual memory 12 to physical memory 14. There is no particular order in which pages are transferred from virtual memory 12 to physical memory 14, and, therefore, sequential pages in virtual memory 12 may not be sequential pages in physical memory 14.

Once the process that is running on the computer system has used the page, a different process may require physical space in the physical memory 14. If none is available, it is necessary for a page in physical memory 14 to be "swapped" from physical memory 14 to the storage device 16. Additionally, if a process requires a page which has been placed into the storage device 16, that page must be swapped from the storage device 16 into physical memory 14.

Figure 2:
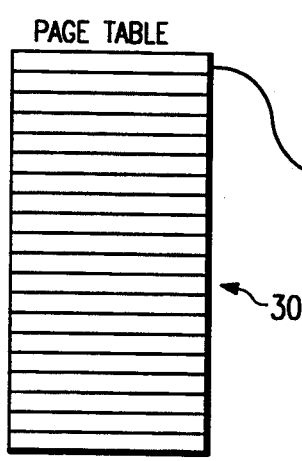
FIG. 2 is a page table and a page table entry in accordance with he prior art.

It is the job of a paging based memory management to map and locate pages between virtual memory 12, physical memory 14 and the storage device 16. Referring to FIG. 2, in an "i386/i486" based microprocessor a paging based memory management typically uses a page table 30 which includes a plurality of page table entries 32. Each page table entry 32 comprises an address section 34 and a series of information bits or flags 36. The information flags 36 are used for a number of purposes such as, for example, to indicate whether or not the page is present in physical memory, whether the page is a read/write page, and so on to include an accessed/not accessed flag, as identified by the reference numeral 38. The purpose of the flag 38 is to allow the paging based memory management to attempt to keep track of whether a page has or has not been recently used. The flag 38 is set by the base hardware (i386/i486 chip) every time the page is accessed.

In conjunction with the paging based memory management, an ager is used to assist with the swapping between physical memory 14 and storage 16. The purpose of the ager is to scan the accessed/not accessed flags 38 and, when space is needed in physical memory 14, to swap the least recently used pages from physical memory 14 to the storage device 16. Due to the limited amount of information available to the ager from the single accessed/not accessed flag 38, it is possible that the ager will select the wrong page to be swapped from physical memory 14. This is possible due to the fact that once the flags 38 for different PTE's are set, the ager has no way of knowing which flag 38 was set most recently. Additionally, once the ager scans all the PTEs, the flags 38 are reset and thus, there is no way to determine which page was accessed last.

Ager does all of its work at the expense of the rest of the operating system. If the system is idle, there is lots of time for ager to do its job, if not, ager must "steal" time from the operating system to ensure that there are enough pages designated for the "idle" list (a listing of a predesignated number of pages that have not been accessed since the last ager scan and is used whenever a page must be swapped out of physical memory).

To operate, ager must go through each page table entry in each page table for each process to see what has/has not been used recently. If the flag 38 is set, the page has been used. If the flag 38 is not set, the page has not been accessed and ager can designate the page for the idle list.

Working independently of ager is a part of the operating system called the "scheduler." It is the scheduler's job to allocate CPU time to the different processes that are running. The scheduler uses some priority system to allocate the available time to the various processes. Since ager does not work with the scheduler, ager does not know about the position of a process within the scheduler's priority list. Thus it is possible that a high priority on scheduler's list could be swapped out by ager before there was CPU time available to run that page of the process. Therefore, a fault would occur, resulting in a time and efficiency loss.

The ager preferably should provide aging services to those processes which were accessed or given CPU time since the last aging cycle to that process, i.e., the pages of the processes which had any possibility at all of being accessed. Additionally, there will be some processes in the system which for various reasons are not getting any CPU time and should be strong candidates for being swapped out. If such processes exist, the ager should give higher priority to the pages of those unused processes and swap them out since there is a higher probability that they will not be accessed in the near future.

For example, using prior art paging memory management, the processes which did not get any CPU time could be unfairly penalized for not being accessed even if they are on a scheduler high priority. It is possible that out of N processes running at exactly the same scheduling priority, M processes did not get any CPU time since the last aging cycle. Thus it may be more correct to look at the page access history of only those (N-M) processes which actually received any CPU time.

The present invention herein thus provides a plurality of different classes into which all processes can be categorized in order to look at only those processes which are truly low usage or which have actually received CPU time. In a preferred embodiment the plurality of classes comprise:

Class 1—those processes which have received repeated CPU time slices after the last aging service;

Class 2—those processes which have received some CPU time slices, less than a certain preselected threshold value, since the last aging cycle;

Class 3—those processes which have not received any CPU time slices since the last aging cycle; and Class 4—those processes which have received no CPU time slices for a certain number (pre-defined by another threshold value) of aging cycles.

Figure 3:
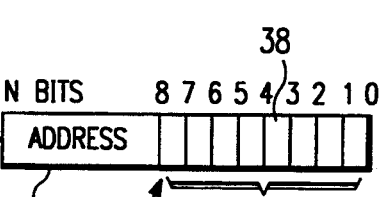
FIG. 3 is a table format for use in accordance with the present invention.

Referring to FIG. 3, a formatted table 50 is constructed in accordance with the present invention with an entry for every process 52 in the computer system. Each entry includes a record of how many CPU time slices the process received since the last aging service thereto. Each time a process gets a time slice from the scheduler, the count in the Counter C1, indicated by the reference numeral 54, will increment. Each time the ager gives the aging service to a process, the counter 54 will be reset. A second Counter C2, indicated by the reference numeral 56, will record the number of times ager detected "no time allocated" to that process. A "0"

value in the Counter C1 will indicate a "no time allocated" to that process. For example, if the ager detected that for two consecutive cycles the process did not receive any CPU time, the Counter C2 will contain the value "2." The C2 counter will be reset when the process does receive a CPU time slice.

A process is classified as belonging to Class 2 if its C1 count is within a certain range of predetermined threshold values and the C2 count is zero. A process is classified as belonging to Class 3 if its C1 count is zero and its C2 count is within a certain range of predetermined threshold values. The exact threshold values can be determined by tuning and measurements for each computer system.

A high value (greater than the maximum threshold value for a Class 3) of the C2 counter suggests that the corresponding process has not been receiving any time slices and there is a possibility that the process is of very low priority or of a low usage type and, therefore, is a good candidate to look at for pages to be paged out. Such a process is classified as a Class 4.

Similarly, a very high count (greater than the maximum threshold value for a Class 2) in the C1 counter and a "0" in the C2 counter suggests that the process has not been getting aging services and has been getting a large amount of CPU time. A high value in the C1 counter would suggest that the "least recently used" information could get "fuzzy," i.e., difficult to determine the order of the actual page access. Processes with a high C1 and "0" in C2 are categorized into Class 1.

Thus the four classes provide the information needed to create an order for the ager to scan the page table entries for pages to be swapped out. In the preferred embodiment the order of the scan is Class 4, Class 1 and finally Class 2. Class 3 will not be scanned, as there is too high a chance for the wrong pages being swapped out.

Referring to FIGS. 4 and 5, flowcharts of the present invention are illustrated. Referring first to FIG. 4, a flowchart depicting execution of the scheduler in conjunction with the present invention is shown. At block 60, a process is identified to which a CPU time slice will be given. At block 62 the C1 counter in the table 50 (see FIG. 3) corresponding to that process is incremented. At block 64 the process continues with the time slice given to the process identified at block 60.

Referring next to FIG. 5, a flowchart of the process of the present invention every time ager obtains a CPU time slice is illustrated. At block 66 ager begins followed by selecting the first entry in the table 50 (see FIG. 3) at block 68. At decision block 70, it is determined whether or not Counter C1 equals zero. If the response to decision block 70 is yes, Counter C2 is incremented at block 72. If the response to decision block 70 is no, Counter C1 is greater than zero and thus counter C2 is reset at block 74. At decision block 76 it is determined whether or not all entries have been "visited," or serviced. If the response to decision block 76 is no, the next entry is selected at block 78 followed by a return to decision block 70. If the response to decision block 76 is yes, the ager proceeds to select the first entry from the table 50 (see FIG. 3) at block 80. At decision block 82 it is determined whether or not Counter C1 is greater than t1 (t1 is a tunable threshold value) and whether or not C2 equals zero. If the response to decision block 82 is yes, the entry is marked as a Class 1 at block 84. If the response to decision block 82 is no, it is determined at decision block 86 whether or not Counter C1 is less than t1 and greater than t2 (t2 is a second tunable threshold value), and if Counter C2 is equal to zero. If the response to decision block 86 is yes, the entry is marked as a Class 2 at block 88. If the response to decision block 86 is no, it is determined at decision block 90 whether or not Counter C1 equals zero, and Counter C2 is greater than t3 (t3 is a third tunable threshold value) and less than t4 (t4 is a fourth tunable threshold value). The tunable values t1, t2, t3 and t4 will vary from system to system and will depend upon workload characteristics. If the response to decision block 90 is yes, the entry is marked as a Class 3 at block 92. If the response to decision block 90 is no, it is determined at decision block 94 whether or not Counter C1 equals zero and Counter C2 is greater than t4. If the response to decision block 94 is yes, the entry is marked as a Class 4 at block 96. If the response to decision block 94 is no or after blocks 84, 88, 92 and 96, it is determined at decision block 98 whether or not all entries have been visited. If the response to decision block 98 is no, the next entry is selected at block 130 followed by a return to decision block 82. If the response to decision block 98 is yes, aging services are provided first to all processes marked Class 4 at block 132 (while there is CPU time available). At block 134, aging services are then provided to all processes marked as Class 1 (while there is CPU time available). At block 136, aging services are provided to all entries marked as Class 2 (while there is CPU time available). Upon completion of block 136, the ager exits at block 138 and the cycle is ended.

Figure 6:
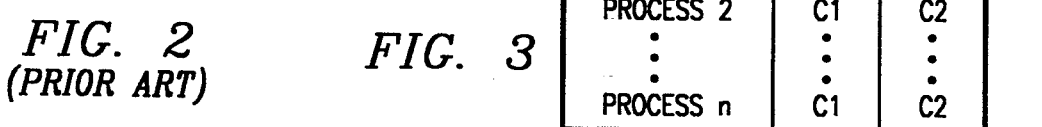
FIG. 6 is a schematic view of a data processing system in accordance with the present invention.

Referring next to FIG. 6, there is shown, in block diagram form, a data processing system generally identified by the reference numeral 100 according to the present invention. The system 100 includes a processor 102, which includes a central processing unit (CPU) 104 and a memory 106. Additional memory, in the form of a hard disk storage 108 and a diskette device 110, is connected to the processor 102. The diskette device 110 receives a diskette 112 which has computer program code recorded thereon that implements the present invention in the system 100. The system 100 includes user interface hardware, including a mouse 114 and a keyboard 116 for allowing user input to the processor 102 and a display 118 for presenting visual data to the user. The system 100 may also include a printer 120.

Although the present invention has been particularly shown and described with reference to a preferred embodiment, it will be understood by those skilled in the art that various changes in form an detail may be made without departing from the spirit and the scope of the invention.

What I claimed is:

1. A method of increasing efficiency of an ager in paging based memory management of a computer system, wherein a plurality of processes may be run, comprising the steps of:
   placing a process into a first class if the process has received a plurality of central processing unit time slices greater than a predetermined number after an aging service thereto;
   placing a process into a second class if the process has received a plurality of central processing unit time slices less than said predetermined number after an aging service thereto;
   placing a process into a third class if the process has received no central processing unit time slices after an aging service thereto;

placing a process into a fourth class if the process has received no central processing unit time slices after a predesignated number of aging services thereto; and designating a page of a process for an idle list based upon which one of said first, second, third and fourth class said process is placed in and an accessed/not accessed history.

2. The method of claim 1, wherein the step of designating includes:

providing aging services to pages from said fourth class first;

providing aging services to pages from said first class next, if needed; and providing aging services to pages from said second class next, if needed.

3. The method of claim 1, further comprising the step of:

forming a table for maintaining a count for each process of every central processing unit time slice allocated thereto and for every time the ager detects there were no time slices allocated thereto.

4. The method of claim 3, further comprising the step of:

resetting said count of time slices allocated each time the ager services the process.

5. A system for increasing efficiency of an ager in a paging based memory management of a computer system, wherein a plurality of processes may be run, comprising:

a plurality of classes into which each of the processes will be classified, said classes creating a priority for providing services of the ager and comprising at least:

a first class for receiving any process which has received a plurality of central processing unit time slices greater than a predetermined number after an aging service thereto;

a second class for receiving any process which has received a plurality of central processing unit time slices less than said predetermined number after an aging service thereto; and a third class for receiving any process which has received no central processing unit time slices after an aging service thereto.

6. The system of claim 5, further comprising:

a table for maintaining a count for each process of every central processing unit time slice allocated thereto and for every time the ager detects there were no time slices allocated thereto.

7. The system of claim 5, further comprising:

a fourth class for receiving any process which has received no central processing unit time slices after a predesignated number of aging services thereto.

8. A computer system for efficiently utilizing an ager in a paging based memory management thereof, wherein a plurality of processes may be run, comprising:

means for placing a process into a first class if the process has received a plurality of central processing unit time slices greater than a predetermined number after an aging service thereto;

means for placing a process into a second class if the process has received a plurality of central processing unit time slices less than said predetermined number after an aging service thereto;

means for placing a process into a third class if the process has received no central processing unit time slices after an aging service thereto;

means for placing a process into a fourth class if the process has received no central processing unit time slices after a predesignated number of aging services thereto; and means for designating a page of a process for an idle list based upon which one of said first, second, third and fourth class said process is placed in and an accessed/not accessed history.

9. The system of claim 8, wherein the means for designating includes:

means for providing aging services to pages from said fourth class first;

means for providing aging services to pages from said first class next, if needed; and means for providing aging services to pages from said second class next, if needed.

10. The system of claim 8, further comprising:

means for forming a table for maintaining a count for each process of every central processing unit time slice allocated thereto and for every time the ager detects there were no time slices allocated thereto.

11. The system of claim 10, further comprising:

means for resetting said count of time slices allocated each time the ager visits the process.

* * * * *